July 16, 1963 H. KAISER 3,097,854
SHAFT PACKING GLAND

Filed June 9, 1960 2 Sheets-Sheet 1

Inventor
H. Kaiser

Inventor
H. Kaiser

United States Patent Office 3,097,854
Patented July 16, 1963

3,097,854
SHAFT PACKING GLAND
Herbert Kaiser, Heaton Moor, Stockport, England, assignor to Francis Shaw & Company Limited, Manchester, England, a British company
Filed June 9, 1960, Ser. No. 34,966
Claims priority, application Great Britain June 17, 1959
4 Claims. (Cl. 277—24)

This invention relates to glands for shafts of machines in which materials which may be liable to harden or form lumps are treated, such as internal mixers for rubber or plastics, and has for its object to provide a gland which is adapted to permit a controlled leakage.

According to the invention, the gland comprises a packing member, adapted to be secured to the shaft and to rotate with the shaft, within a stationary gland bush or housing, and having a helical groove on its outer surface and a ring of teeth at its inner end adapted to cooperate with teeth in the housing to grind and reduce material passing the teeth.

Preferably the packing member is made in sections adapted to be placed around the shaft and secured together by bolts in a flange at the outer end of the member. The helical groove may be of approximately semi-circular section, with lands between the convolutions, and at the outer end it may run into an undercut groove in the angle between the cylindrical surface of the gland packing member and the flange at its outer end.

The teeth may be formed on a frusto-conical surface at the inner end of the packing member, and may be of sawtooth shape. The teeth in the housing may be formed on an insert in the housing, which insert may have a frusto-conical surface on which the teeth are formed. A small gap is left between the two sets of teeth, and any material passing between the interior of the machine and the helical groove has to pass through this gap, where it is ground by the two sets of teeth. Where teeth of sawtooth form are used, the steeper face may be the leading face as the packing member rotates, the stationary teeth having their steeper faces facing the steeper faces of the moving teeth.

The helical groove may be of either hand, in relation to the direction of rotation, depending on the amount of leakage to be allowed, the amount of leakage being greater when the direction of rotation is such that the groove tends to feed leaking material towards the outside.

A gland according to the invention can readily be installed in a machine in place of the existing gland.

Referring to the accompanying drawings.

Figure 1:
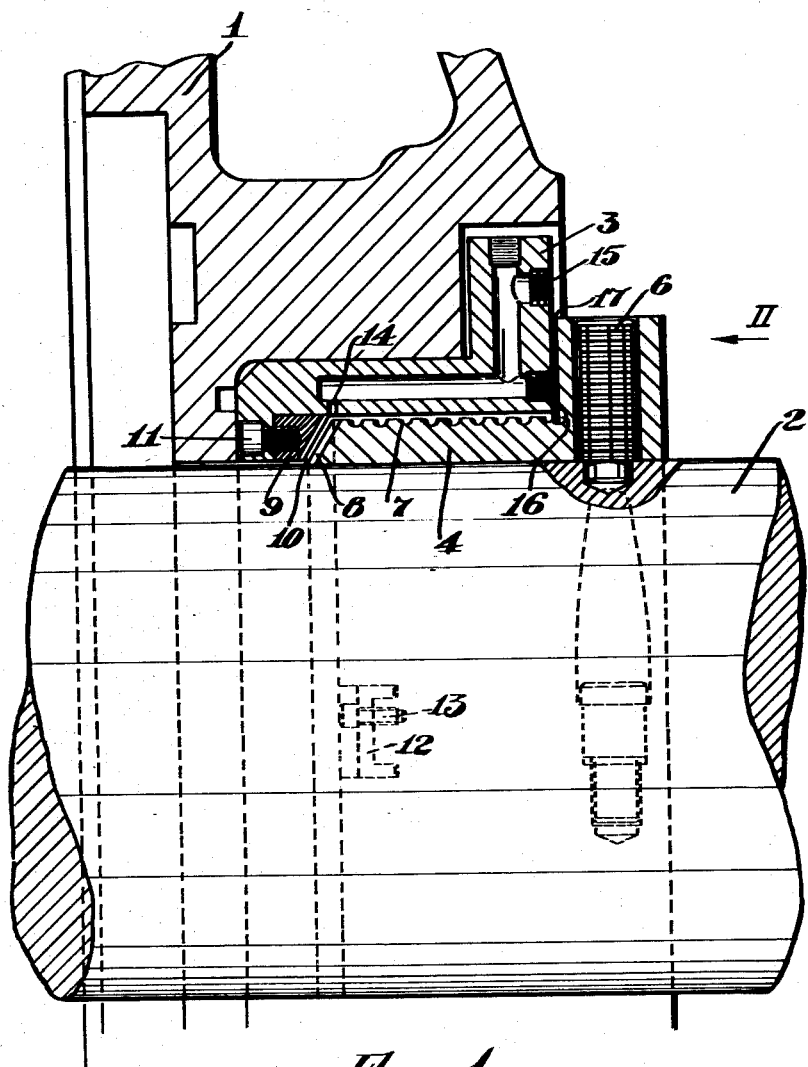
FIGURE 1 is an axial section, on the line I—I of FIGURE 2, of a gland arrangement in accordance with the invention.
Figure 2:
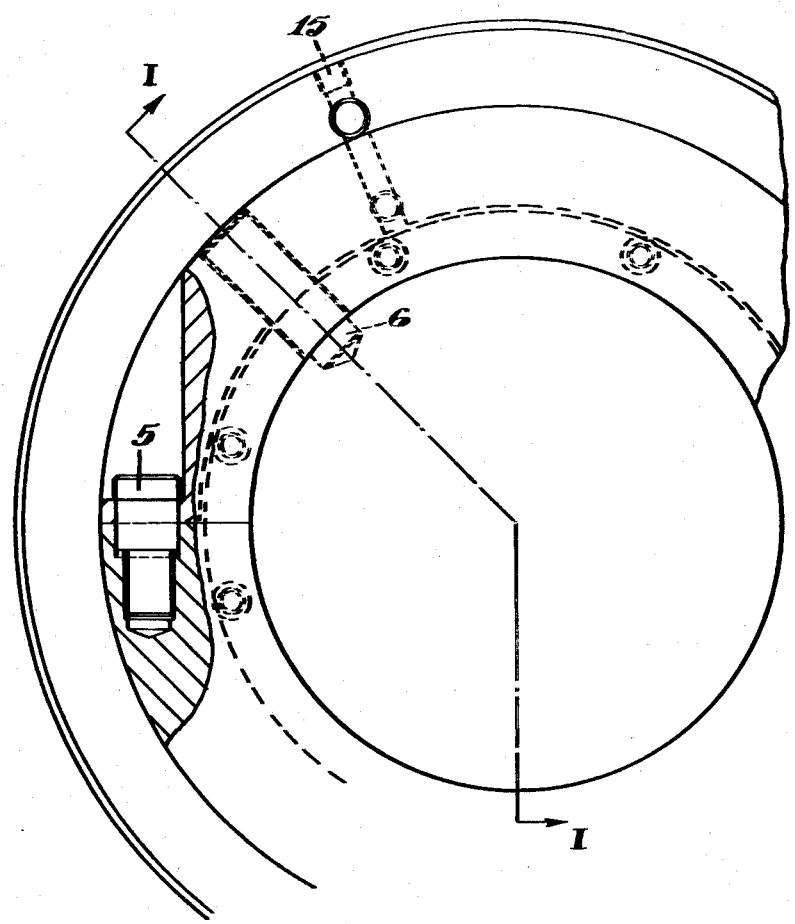
FIGURE 2 is a view in the direction of the arrow II of FIGURE 1.

In the drawings, 1 is a part of the end of a machine such as an internal mixer for rubber or plastics, and 2 is the shaft of one of the rotors of the machine. In the part 1 is fitted a gland bush 3, which closely surrounds the shaft 2 at the inner end of the bush, but at its outer part is of larger internal diameter to accommodate a gland packing 4. The packing 4 is in two halves secured together by screws 5 in its end flange, and is fixed on the shaft 2 by means of a set screw 6. The cylindrical surface of the packing 4, which is surrounded by the bush 3, has a helical groove or screw thread 7, and the inner end of the packing 4, is frusto-conical and inclines inwardly towards the shaft 2 and is formed with teeth or serrations 8. The gland bush 3 has at its inner part a frusto-conical insertion piece 9 formed with teeth or serrations 10 which face the teeth 8 and are spaced therefrom. The insertion piece 9 is secured by means of screws 11. The teeth 8 and 10 are of saw-tooth form. In the case of the teeth 8 which turn with the shaft 2, the steeper faces of the teeth are the leading faces in the direction of rotation, and in the case of the stationary teeth 10, the steeper faces face the steeper faces of the teeth 8.

At the joint on each side of the shaft 2 between the two halves of the gland packing 4, the teeth 8 are interrupted and the two halves are slotted to take a locking piece 12 which is fixed by a screw 13 to secure the two halves together.

The gland bush 3 has a bore 14 opening into its interior wall opposite the gap between the teeth 8, 10, and having an opening 15 in the outside of the flange at the outer end of the bush. This opening can be connected to a pump supplying oil or grease to fill the cavities in the gland and prevent dust blowing out under the pressure inside the machine. The bore 14 and its opening 15 are shown in FIGURE 1 out of their true angular position.

The helical groove 7 is of approximately semicircular section with lands between the convolutions, and at the outer end it runs into an undercut groove 16 in the angle between the cylindrical surface of the gland packing member 4 and its end flange. There is a narrow gap 17 left between this end flange and the end flange of the gland bush 3, through which material leaking through the gland escapes. A box or cap may be fitted around the end of the gland to collect the leaking material.

When glands according to the invention are installed in an internal mixer, the helical grooves 7 will be right handed at one end of the back rotor and at the other end of the front rotor, and left-handed at the remaining positions.

As stated above, the gland of this invention permits leakage of material therethrough, and the amount of such leakage is controlled by providing right or left-hand helical grooves 7 with respect to the direction of rotation of the shaft 2. Thus, when the grooves 7 tend to convey material outwardly the amount of leakage is greater than when the grooves 7 are arranged to oppose the outward flow of material.

What is claimed is:

1. A shaft gland for an internal mixer for rubber or plastic material, said mixer including a housing and a shaft, said gland comprising an elongated packing member adapted to be secured to and to rotate with the shaft with one end disposed within the housing, an elongated stationary gland bush disposed in the housing surrounding the packing member and spaced therefrom, said packing member having a helical groove on its outer surface, a ring of radial teeth on said one end of the packing member, and radial teeth on said bush in facing spaced relationship with and adapted to cooperate with the teeth on said packing member to grind and reduce material passing between said teeth, said material flowing outwardly between said packing member and said bush.

2. A gland as claimed in claim 1 having a flange at the end of said packing member opposite said one end and in which said helical groove is of approximately semi-circular section, with lands between the convolutions, said groove terminating at said opposite end in an undercut groove provided in the angle between the cylindrical surface of the said packing member and said flange.

3. A gland as claimed in claim 1, in which said first-mentioned teeth are formed on a frusto-conical surface on said one end of said packing member, and an insert in said bush having a frusto-conical surface, said second-mentioned teeth being formed on said last mentioned surface.

4. A gland as clamed in claim 1, in which the teeth are of saw-tooth shape, with the steeper faces of the teeth on said bush facing the steeper faces of the teeth on said packing member.

References Cited in the file of this patent

UNITED STATES PATENTS

| | | |
|---|---|---|
| 450,004 | Daley | Apr. 7, 1891 |
| 1,484,525 | Noeggerath | Feb. 19, 1924 |
| 1,504,658 | Ulmer | Aug. 12, 1924 |
| 1,720,696 | Simpson | June 16, 1929 |
| 1,770,496 | Lawaczeck | July 15, 1930 |
| 1,826,057 | Dobbins | Oct. 6, 1931 |
| 2,371,681 | Durdin | Mar. 20, 1945 |
| 2,458,068 | Fuller | Jan. 4, 1949 |
| 2,487,177 | Pollock | Nov. 8, 1949 |